United States Patent

Siegfried et al.

[11] Patent Number: 6,067,848
[45] Date of Patent: May 30, 2000

[54] PORTABLE TIRE UNIFORMITY MEASUREMENT SYSTEM AND METHOD

[75] Inventors: James F. Siegfried, Medina; Donald E. Andrews, Mogadore; William P. Stanfield, Cuyahoga Falls; Gregory D. Chaplin, Chippewa, all of Ohio

[73] Assignee: Bridgestone/Firestone, Inc., Akron, Ohio

[21] Appl. No.: 08/813,921

[22] Filed: Mar. 7, 1997

[51] Int. Cl.[7] .............................. G01M 17/02; B60C 9/00
[52] U.S. Cl. ................................................. 73/146; 73/8
[58] Field of Search .......................... 73/8, 146, 865.8; 152/454, 531, 546, 547, 548, 549, 550, 552, 553, 554, 556, 564

[56] References Cited

U.S. PATENT DOCUMENTS

| | | |
|---|---|---|
| 3,580,064 | 5/1971 | Baron et al. . |
| 3,585,840 | 6/1971 | Landsness ................................ 73/1.08 |
| 4,311,044 | 1/1982 | Marshall et al. . |
| 4,402,218 | 9/1983 | Engel . |
| 4,434,652 | 3/1984 | Christie . |
| 4,440,018 | 4/1984 | Christie . |
| 4,475,384 | 10/1984 | Christie . |
| 4,479,381 | 10/1984 | Kounkel et al. . |
| 4,896,531 | 1/1990 | Hayes . |
| 5,359,885 | 11/1994 | Ohms . |
| 5,448,910 | 9/1995 | Yurjevich et al. ........................ 73/146 |

*Primary Examiner*—William L. Oen
*Attorney, Agent, or Firm*—Renner, Otto, Boisselle & Sklar LLP

[57] ABSTRACT

A portable test apparatus (and associated method) for measuring nonuniformity of a tire/wheel assembly in situ on a wheel bearing hub of a vehicle are characterized by a lightweight assembly of components including, in particular, a probe for monitoring deflections of a surface of the tire/wheel assembly during rotation of the tire/wheel assembly and producing an electrical output indicative of the surface deflections, and an indexing device for producing an electrical output indicative of the rotational position of the tire/wheel assembly during rotation thereof, the indexing device having an attachment mechanism for removable coupling to the tire/wheel assembly. A holder is provided for holding the probe adjacent the surface of the tire/wheel assembly to be monitored for uniformity, and an electronic processor is provided for receiving and processing the electrical outputs from the probe and indexing device to provide an output indicative of at least one parameter representative of the nonuniformity of the tire/wheel assembly.

26 Claims, 4 Drawing Sheets

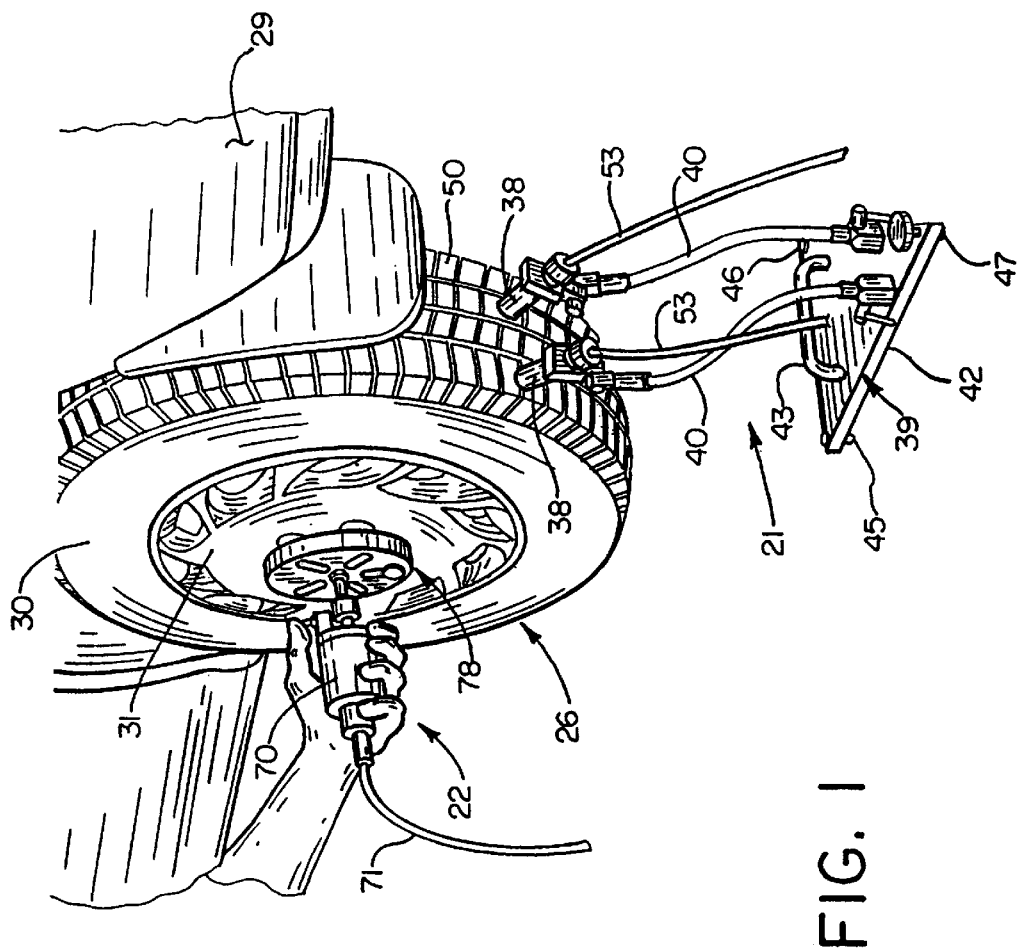
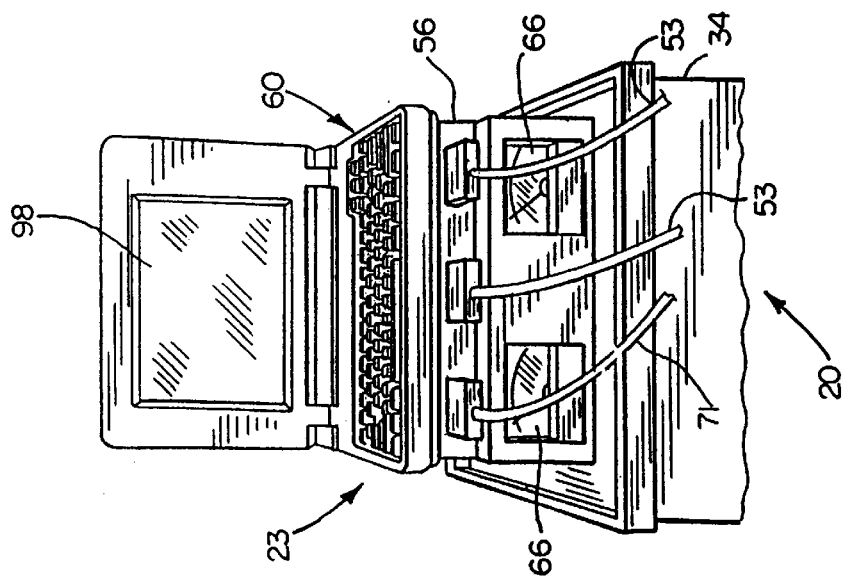
FIG. 1

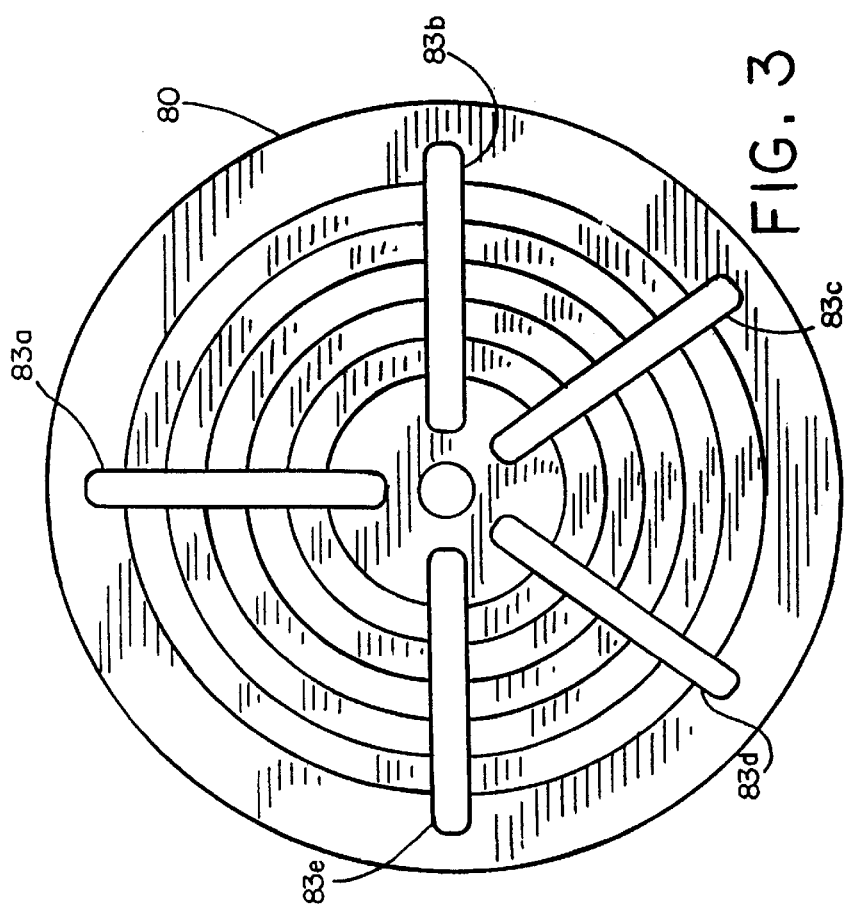
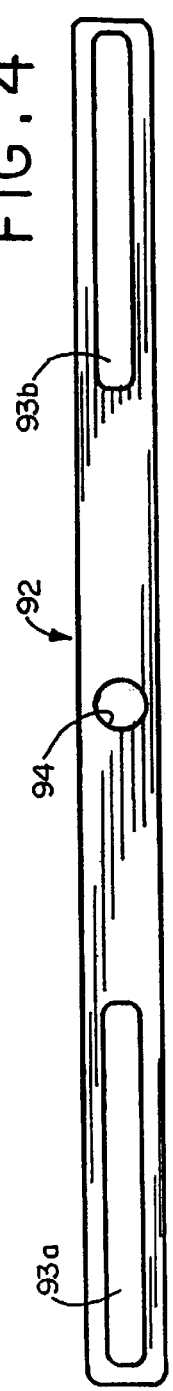

6,067,848

PORTABLE TIRE UNIFORMITY MEASUREMENT SYSTEM AND METHOD

The invention herein described relates generally to a system and method for the testing of tires. More particularly, the invention relates to a portable system which may be easily transported to a testing site in the field to determine the uniformity, particularly radial runout, of tire/wheel assemblies (or other rotating members).

BACKGROUND OF THE INVENTION

Various types of machines have been developed for measuring the uniformity of a tire, including the tire's radial runout, i.e., or out of roundness. Many of these machines are configured for laboratory settings, while others are intended for field use. An example of the latter type of machine is disclosed in U.S. Pat. No. 5,448,910. This machine can be transported, for example, to an automotive production plant where a finished vehicle is being tested and vibration is detected. The tire/wheel assembly can then be tested to determine if the vibration causing problem resides in the tire/wheel assembly. This avoids the need to ship the tire/wheel assembly to a remote laboratory for testing, which is time consuming.

For several reasons it would be advantageous to have a test apparatus that can measure tire uniformity and particularly radial runout while the tire/wheel assembly remains mounted to the vehicle. For instance, this would enable detection of a runout problem arising from the wheel-hub interface. Also, this eliminates the need to remove the tire/wheel assembly from the vehicle and install it on a test machine. Moreover, it would be advantageous for such test apparatus to be of small size and weight for easy portability, and particularly of a size and weight which allows the test apparatus to be hand carried from one location to another.

SUMMARY OF THE INVENTION

The present invention provides a portable system for measuring nonuniformity of a rotary member, and particularly a tire/wheel assembly in situ on a wheel bearing hub of a vehicle. The system is characterized by a lightweight assembly of components including, in particular, a probe for monitoring deflections of a surface of the tire/wheel assembly during rotation of the tire/wheel assembly and producing an output signal indicative of the surface deflections, and an indexing device for producing an output signal indicative of the rotational position of the tire/wheel assembly during rotation thereof, the indexing device having an attachment mechanism for removable coupling to the tire/wheel assembly. According to a preferred embodiment of the invention, there is provided a holder for holding the probe adjacent the surface of the tire/wheel assembly to be monitored for uniformity, and an electronic processor for receiving and processing the output signals from the probe and indexing device to provide an output indicative of at least one parameter representative of the nonuniformity of the tire/wheel assembly.

Further in accordance with a preferred embodiment of the invention, the indexing device includes a housing, and a start switch on the housing for initiating a read operation during which the output signals from the probe and indexing device are received by the electronic processor during rotation of the tire/wheel assembly. A preferred indexing device includes an encoder having a rotary input connected to the attachment mechanism and a housing suitable to be held in a user's hand for positioning adjacent the tire/wheel assembly with the attachment mechanism engaged with the tire/wheel assembly.

A preferred form of attachment mechanism according to the invention includes one or more sockets for receiving a respective lug nut/bolt that secures the tire/wheel assembly to the wheel bearing hub and a rotatable mount for the sockets. The sockets are adjustable on the rotatable mount radially with respect to the rotational axis of the rotatable mount, preferably through the provision of a plurality of radially extending slots in the rotatable mount. The sockets are mounted to the rotatable mount for adjustment along respective slots. As is also preferred, the slots are strategically arranged to accommodate different wheel lug patterns. For four and five lug patterns, a preferred arrangement includes a first slot disposed at right angles to diametrically opposed second and third slots, and fourth and fifth slots forming 54° angles with the second and third slots, respectively. In another arrangement for even number lug patterns, a pair of diametrically opposed slots is provided in a rotatable mount for the sockets.

Further in accordance with a preferred embodiment of the invention, the electronic processor may provide a graphical display of the at least one parameter representative of the nonuniformity of the tire/wheel assembly. A probe positioning device is also provided for facilitating positioning of the probe within a prescribed distance from the surface to be monitored for enabling proper operation of the probe. A preferred probe positioning device includes a display for displaying a parameter indicative of the output of the probe.

A preferred holder includes a stand to which the probe is mounted. The stand is adapted for stable resting on a horizontal surface, and the probe is mounted to the stand by an adjustable stem. A second probe may be also be mounted to the stand by an adjustable stem and used for monitoring a surface of the tire/wheel assembly at a location different from that of the first probe.

According to another aspect of the invention, a method for measuring nonuniformity of a rotary member, and particularly a tire/wheel assembly in situ on a wheel bearing hub of a vehicle, comprises the steps of (i) positioning a probe adjacent the surface of a tire/wheel assembly to be monitored for uniformity, the probe being operative to monitor deflections of a surface of the tire/wheel assembly during rotation of the tire/wheel assembly and produce an output signal indicative of the surface deflections; (ii) removably coupling an indexing device to the tire/wheel assembly, the indexing device being operative to produce an output signal indicative of the rotational position of the tire/wheel assembly during rotation thereof; (iii) rotating the tire/wheel assembly to cause the probe and indexing device to produce the output signals thereof; and (iv) using an electronic processor to receive and process the output signals produced by the probe and indexing device to provide an output indicative of at least one parameter representative of the nonuniformity of the tire/wheel assembly. Preferably, a start switch on the housing of the indexing device is used to initiate a read operation during which the output signals from the probe and indexing device are received by the electronic processor during rotation of the tire/wheel assembly. As is also preferred, the indexing device is held in engagement with the tire/wheel assembly by a user's hand, and a probe positioning device is used to position the probe within a prescribed distance from the surface to be monitored for enabling proper operation of the probe.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

BRIEF DESCRIPTION OF THE DRAWINGS

FIG. 1 is a perspective view of a measurement system according to the present invention.

FIG. 3 is an axial view of a rotary mounting member looking from the line 3—3 of FIG. 2.

FIG. 4 is an axial view of another form of mounting member usable in place of the mounting member of FIG. 3.

DETAILED DESCRIPTION OF THE INVENTION

Figure 2:
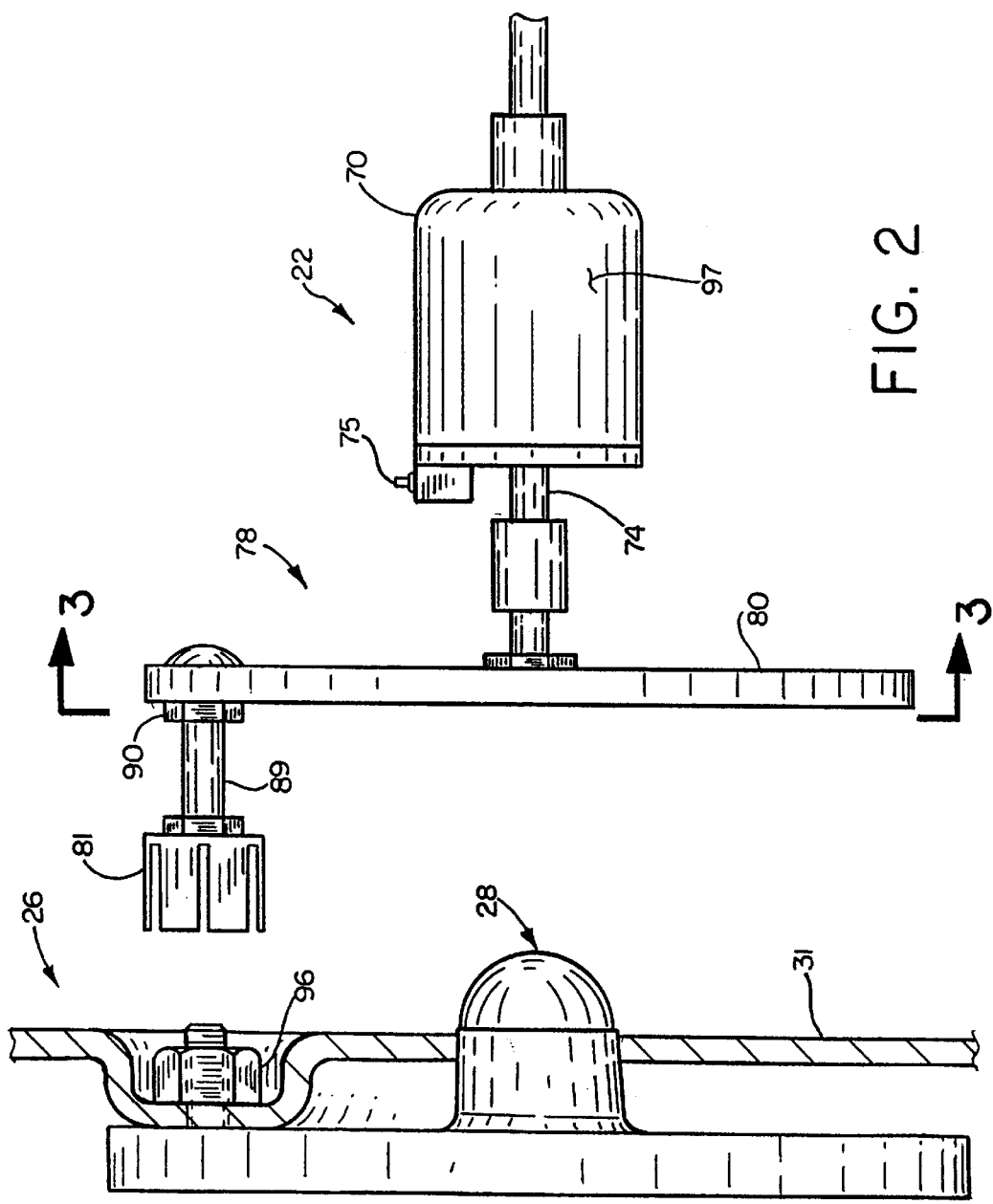
FIG. 2 is an enlarged elevational view of an indexing device used in the system of FIG. 1.

Referring now in detail to the drawings and initially to FIG. 1, a preferred embodiment of portable runout measurement system according to the invention is indicated generally at 20. The runout measurement system 20 generally comprises a probe assembly 21, an indexing device 22 and an electronic processing apparatus 23. In FIG. 1, the system is shown in operative relation to a tire/wheel assembly 26 to be tested for uniformity, although it will be appreciated that system may be used to measure uniformity of other types of rotary members. As is preferred, the tire uniformity and particularly radial runout can be measured while the tire/wheel assembly is mounted to a wheel bearing hub 28 (FIG. 2) of a vehicle 29. This not only eliminates the need to remove the tire/wheel assembly from the vehicle for transport and/or mounting in a test apparatus, but it also enables detection of a runout problem arising from the wheel-hub interface. The tire/wheel assembly is composed of a tire 30 mounted to a wheel 31.

In use, the electronic processing apparatus 23 can be conveniently supported on a cart 34. The cart may also have provision for supporting a power source, such as a battery on a lower shelf, and the probe assembly 21 and indexing device 22 when not in use. This arrangement provides for easy movement of the system from place to place at a given facility, such as an automotive assembly plant. For transport of the system from one location to another, the probe assembly, indexing device and processing apparatus can be conveniently packed in a suitcase or similar container for hand carrying. The cart 34 may be of a breakdown type for easy transport along with the other components that are carried in the suitcase.

The probe assembly 21 includes a pair of probes 38, although a single probe or more than two probes may be used as may be desired. Each probe 38 is mounted on a stand 39 by an adjustable stem 40, such as a gooseneck-type stem which permits universal adjustment of the position of the probe. The stand 39 in the illustrated preferred embodiment is adapted for stable resting on a horizontal surface, such as a floor; however, other types of stands or probe supports may also be used to position the probes in close proximity to a surface of the tire/wheel assembly 26 to be tested. As shown, the stand 39 may include a triangular plate 42 equipped with a handle 43. On the underside of the plate there may be provided feet 45–47 at respective corners of the plate to provide for three point support on the floor. At least one of the feet, such as the front foot 47, may be vertically adjustable to vary the tilt of the plate for optimal stable positioning of the probes.

To measure radial runout, the probe or probes 38 are positioned adjacent the tread 50 of the tire 30 for sensing or monitoring deflections of the tread surface for enabling a determination of the roundness (conversely, the out of roundness) of the tire/wheel assembly 26. Usually, the center rib of the tread is measured for radial runout; however, radial runout may be measured at other locations such as at the shoulder ribs or intermediate ribs then preferably using both probes 38 for simultaneous measurement at different locations. The probes may also be positioned to measure lateral runout.

In the illustrated preferred embodiment of the invention, the probes 38 are non-contact probes and preferably are capacitance probes, although it will be understood that other types of probes may also be useful. When positioned adjacent a surface of the tire/wheel assembly 26 to be monitored, such as the tread surface, the probes 38 will produce an output signal indicative of deflections in the surface, i.e., the output signal will be indicative of the spacing between the probe and tire tread surface and thus will change in response to changes in this spacing.

Figure 5:
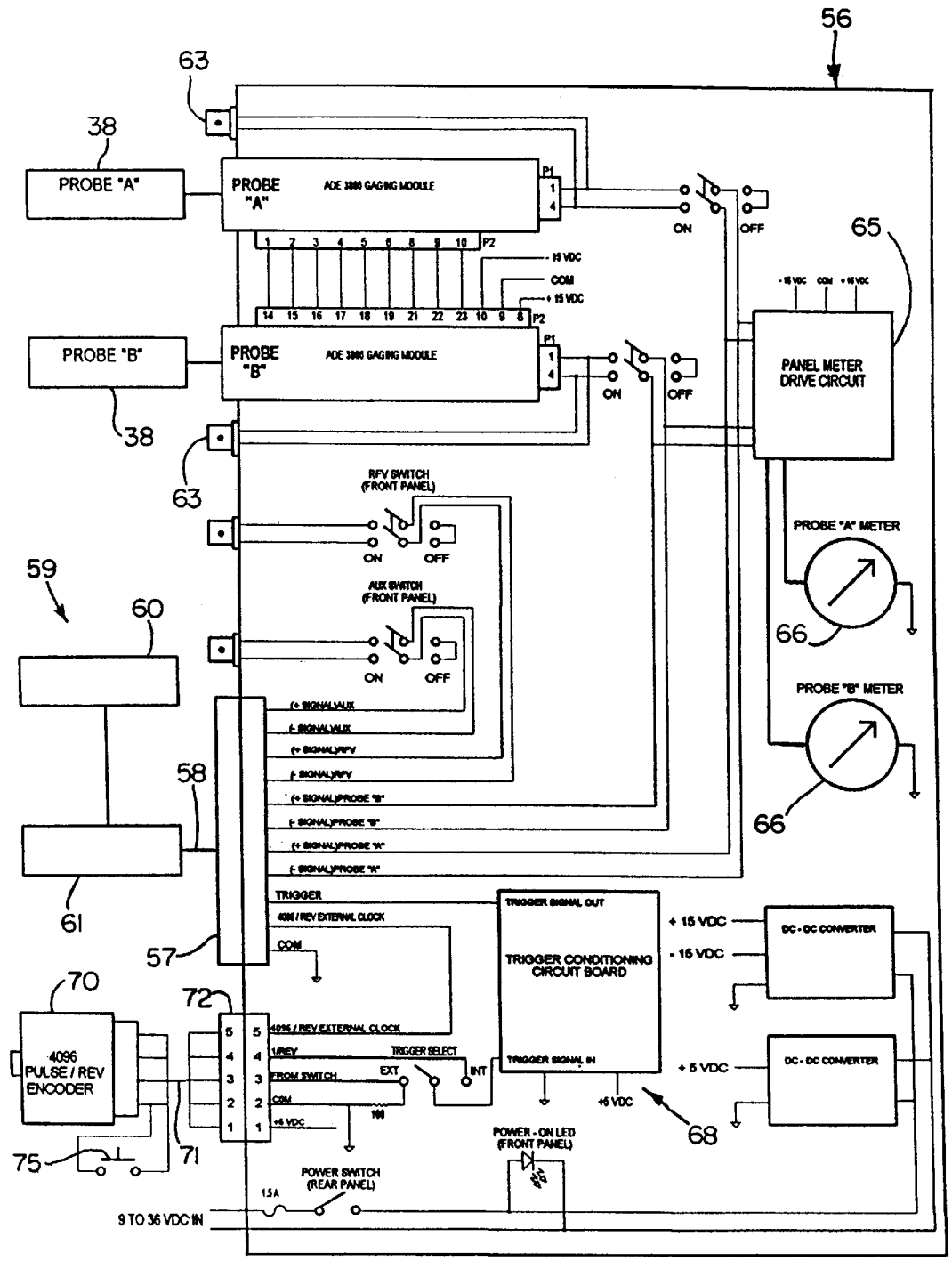
FIG. 5 is a diagrammatic view of the system's electrical components.

The probes 38 are connected at their outputs via suitable leads 53 to the electronic processing apparatus 23 which is diagrammatically shown in FIG. 5. In the illustrated preferred embodiment, the electronic processing apparatus includes an interface unit 56 to which the probes 38 are connected by the leads 53. The interface unit channels the outputs of the probes to a connector 57 which is connected by a cable 58 to a data acquisition system 59 preferably in the form of a portable computer 60 equipped with conventional analog to digital conversion circuitry, such as an A/D data acquisition board 61 with an external clock, for converting the analog signals received from the probes into digital signals for digital processing by the computer (or other processor) in a well known manner. The interface unit 56 also provides separate outputs 63 for the analog signal produced by the probes.

To facilitate proper positioning of the probes 38 relative to the tread surface, the outputs of the probes are supplied to a meter drive circuit 65 for display on respective meters 66. The meters are calibrated to provide an indication of when the probes are positioned to provide an acceptable measurement range relative to the tread surface. For example, this range may be ±0.050 inch for car and light truck tires and ±0.250 inch for larger truck and bus tires. In the illustrated embodiment each meter is equipped with a pointer and a scale identifying the acceptable range of deviation relative to a zero point. Accordingly, the probe can be positioned adjacent the tire tread and the tire rotated. As the tire is rotated, the needle is watched to see if the pointer moves outside the acceptable range. If so, the probe is repositioned until the range of movement of the needle stays within the prescribed range. Preferably, a switch (not shown) is provided to change the gain of the meter for providing different ranges, such as the aforementioned ranges for car and light truck tires and large truck and bus tires.

The interface unit 56 further provides circuitry 68 for channeling, to the data acquisition system 59, the output signal of the indexing device 22. As shown, the indexing device includes an encoder 70, such as a 4096 pulse encoder, which is connected via a cable lead 71 to a connector 72 of the interface unit. The encoder provides 4096 pulses per revolution of the rotary input shaft 74 (FIG. 2) of the encoder, thereby providing a high signal rate as is desired. The encoder has associated therewith a start switch 75, for example of the push-button type, for initiating a "read", i.e., data acquisition.

As shown in FIGS. 2 and 3, the rotary input shaft 74 of the encoder 70 is removably coupled to the tire wheel assembly 26 for rotation therewith by an attachment mechanism 78. The attachment mechanism 78 includes a rotatable mount 80 in the form of a plate mounted at the center thereof to the encoder shaft 74. The mounting plate 80 has mounted thereto at least one and preferably a plurality of sockets 81. For universal usage with different types of wheel lug patterns, the sockets 81 are radially adjustable along respective radial slots 83a–83e strategically angularly positioned in the mounting plate 80. Although reference is here made to a "socket" as a device for receiving or capturing the wheel lug nuts, studs, or bolts as the case may be (herein collectively referred to as lugs), it is intended that such term encompass any device capable of engaging the lug nut, stud, bolt or the like used in conjunction with a tire/wheel assembly. Moreover, it will be appreciated that other attachment devices may be employed for attaching elsewhere to the tire/wheel/hub assembly for effecting rotation of the encoder shaft with the tire/wheel/hub assembly, such as for example clips, pins, magnets, etc., all of which may be considered to fall under the penumbra of "attachment means," as such term may be used herein.

Each socket 81 has an extension post 89 in the form of a bolt that extends through a respective slot in the mounting plate 80. The extension post (bolt) may be radially positioned along the radial slot 83 as needed and then suitably fixed in position by a suitable tightening device, such as a jam nut 90. The radial slots 83a–83e are arranged to accommodate different lug patterns, such as the typical four and five lug patterns associated with car and light truck wheels. To this end and as shown in FIG. 3, the mounting plate 80 has a first slot 83a disposed at right angles to diametrically opposed second and third slots 83b and 83e, and fourth and fifth slots 83c and 83d forming 54° angles with the slots 83b and 83e, respectively. Accordingly, the slots 83a, 83c and 83d can be used with a five lug pattern and the slots 83a, 83b and 83e can be used with a four lug pattern. Preferably, three sockets are employed for stable attachment of the mounting plate to the tire/wheel assembly. Also, the sockets can be adjusted radially along the lengths of the slots for different lug circle diameters.

For larger tire/wheel assemblies, where usually an even number of lugs are employed with at least two diametrically opposed to one another, the mounting plate can be replaced by another mounting member 92 shown in FIG. 4. The mounting member is in the form of an elongate plate or bar including two diametrically opposed radial slots 93a and 93b and a center hole 94 for mounting to the encoder shaft 74 (FIG. 2). A socket may be attached at each slot and adjusted equidistant from the center of the mounting bar and at a spacing equal the spacing of the diametrically opposed wheel lugs.

Having described the portable testing apparatus 20, its use and operation in accordance with the method of the invention will now be described. Initially, for in situ testing of a tire/wheel assembly 26 on a vehicle 29, the vehicle is jacked up or the tire/wheel assembly otherwise elevated relative to a floor so that it can be rotated. The probes 38 are positioned adjacent the surface of the tire/wheel assembly to be monitored, such as the tread 50 for radially runout measurement as shown in FIG. 1. Also, the attachment mechanism 78 is adjusted as needed to position the sockets thereof in a pattern for interfitting with the wheel lugs 96 (FIG. 2) holding the tire/wheel assembly to the wheel bearing hub 28.

Now the indexing device 22 can be held by an operator, as at the housing 97 (FIG. 2) of the encoder, with the sockets of the attachment mechanism engaged with the wheel lugs (as shown in FIG. 1) such that rotation of the tire/wheel assembly will effect rotation of the encoder shaft 74. Then the start switch 75 on the encoder 70 can be actuated to initiate data collection. Actuating the start switch sends a trigger signal to the computer 60 to start recording data received from the encoder 70 and the probe or probes 38. The tire is then rotated one complete revolution while the encoder produces pulses indicative of the rotational position of the tire/wheel assembly. In the illustrated embodiment, each pulse represents a 360/4096 degree of rotation of the tire/wheel assembly. The output of the encoder is used as an external clock for the above-mentioned A/D data acquisition board 61 for controlling the sampling of the output signal of the probe or probes that are being used. Thus, in the illustrated system, 4096 data points are obtained from each probe for a single revolution of the tire/wheel assembly. Of course, it will be appreciated that other sampling rates may be employed as desired. Also, data from more than one revolution of the tire/wheel assembly may be collected and averaged, although it has been found that data from just one revolution is sufficient for measuring radial runout.

Preferably, the circumferential position of the surface of the tire/wheel assembly that is first monitored at the start of data collection is identified. Customary markers include the valve stem or the slash in the tire size. Thus, it is preferable to rotate the tire/wheel assembly so as to align either one of these markers with the probe(s) to identify a data collection start point on the tire. As a result, the deflection data acquired by the computer can be positionally correlated to the tire.

Once a complete data set has been collected, the computer 60 (or other processor) can analyze the data and provide an output indicative of at least one parameter representative of the uniformity/nonuniformity of the tire/wheel assembly 26. Various types of well known or easily developed software packages/algorithms similar to those used in existing systems may be used for deriving the desired output readings. Typical parameters for radial runout include peak-to-peak, identification of high and low spots, and first harmonic, second harmonic and so on of a fast Fourier transform of the data set. The output readings may be displayed either graphically or numerically on the computer display 98 and/or printed out on a printer (not shown) interfaced with the computer. The data may additionally or alternatively be stored for later processing.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A portable test apparatus for measuring nonuniformity of a tire/wheel assembly in situ on a wheel bearing hub of a vehicle, comprising
   a probe for monitoring deflections of a surface of the tire/wheel assembly during rotation of the tire/wheel assembly and producing a first output signal indicative of the surface deflections;
   a holder for holding the probe adjacent the surface of the tire/wheel assembly to be monitored for uniformity;
   an indexing device for producing a second output signal indicative of the rotational position of the tire/wheel assembly during rotation thereof, the indexing device having an attachment mechanism for removable coupling to the tire/wheel assembly; and
   an electronic processor for receiving and processing the first and second output signals from the probe and indexing device to provide an output indicative of at least one parameter representative of the nonuniformity of the tire/wheel assembly.

2. A portable test apparatus as set forth in claim 1, wherein the indexing device includes a housing, and a start switch on the housing for initiating a read operation during which the first and second output signals from the probe and indexing device are received by the electronic processor during rotation of the tire/wheel assembly.

3. A portable test apparatus as set forth in claim 2, wherein the indexing device includes an encoder having a rotary input connected to the attachment mechanism.

4. A portable test apparatus as set forth in claim 1, wherein the indexing device includes a housing suitable to be held in a user's hand for positioning adjacent the tire/wheel assembly with the attachment mechanism engaged with the tire/wheel assembly.

5. A portable test apparatus as set forth in claim 1, wherein the attachment mechanism includes at least one socket for receiving a respective lug nut/bolt that secures the tire/wheel assembly to the wheel bearing hub.

6. A portable test apparatus as set forth in claim 5, wherein the attachment mechanism includes a rotatable mount for the at least one socket, and the at least one socket is adjustable on the rotatable mount radially relative to the rotational axis of the rotatable mount.

7. A portable test apparatus as set forth in claim 6, wherein the rotatable mount includes a plurality of radially extending slots, and the at least one socket includes a plurality of sockets mounted to the rotatable mount for adjustment along respective the slots.

8. A portable test apparatus as set forth in claim 7, wherein the plurality of radially extending slots includes a first slot disposed at right angles to diametrically opposed second and third slots, and fourth and fifth slots forming 54° angles with the second and third slots, respectively.

9. A portable test apparatus as set forth in claim 2, wherein the plurality of radially extending slots includes a pair of diametrically opposed slots.

10. A portable test apparatus as set forth in claim 2, wherein the attachment mechanism includes at least one socket for receiving a respective lug nut/bolt that secures the tire/wheel assembly to the wheel bearing hub, and a rotatable mount for the at least one socket, and the rotatable mount is mounted at the rotational center thereof to a rotary input shaft of the encoder.

11. A portable test apparatus as set forth in claim 1, wherein the electronic processor provides a graphical display of the at least one parameter representative of the nonuniformity of the tire/wheel assembly.

12. A portable test apparatus as set forth in claim 1, comprising a probe positioning device for facilitating positioning of the probe within a prescribed distance from the surface to be monitored for enabling proper operation of the probe.

13. A portable test apparatus as set forth in claim 12, wherein the probe positioning device includes a display for displaying a parameter indicative of the output of the probe.

14. A portable test apparatus as set forth in claim 1, wherein the holder includes a stand to which the probe is mounted, the stand being adapted for stable resting on a horizontal surface.

15. A portable test apparatus as set forth in claim 14, wherein the probe is mounted to the stand by an adjustable stem.

16. A portable test apparatus as set forth in claim 15, including a second probe mounted to the stand by an adjustable stem.

17. A method for measuring nonuniformity of a rotary member, comprising the steps of:
   positioning a probe adjacent the surface of a rotary member to be monitored for uniformity, the probe being operative to monitor deflections of a surface of the rotary member during rotation of the rotary member and produce a first output signal indicative of the surface deflections;
   removably coupling an indexing device to the rotary member, the indexing device being operative to produce a second output signal indicative of the rotational position of the rotary member during rotation thereof;
   rotating the rotary member to cause the probe and indexing device to produce the first and second output signals thereof; and
   using an electronic processor to receive and process the first and second output signals produced by the probe and indexing device to provide an output indicative of at least one parameter representative of the nonuniformity of the rotary member.

18. A method as set forth in claim 17, including the step of using a start switch on housing of the indexing device for initiating a read operation during which the first and second output signals from the probe and indexing device are received by the electronic processor during rotation of the rotary member.

19. A method as set forth in claim 17, wherein the indexing device is held in engagement with the rotary member by a user's hand.

20. A method as set forth in claim 17, wherein the rotary member is a tire/wheel assembly in situ on a wheel bearing hub of a vehicle, and the indexing device is coupled to the tire/wheel assembly by an attachment mechanism including at least one socket for receiving a respective lug nut/bolt that secures the tire/wheel assembly to the wheel bearing hub.

21. A method as set forth in claim 20, including the step of adjusting the radial position of the socket on a rotatable mount.

22. A method as set forth in claim 1, wherein the electronic processor is used to provide a graphical display of the at least one parameter representative of the nonuniformity of the rotary member.

23. A method as set forth in claim 1, wherein the positioning step includes using a probe positioning device to position the probe within a prescribed distance from the surface to be monitored for enabling proper operation of the probe.

24. A method as set forth in claim 12, wherein the probe positioning device is used to display a parameter indicative of the output of the probe.

25. A method as set forth in claim 1, wherein the positioning step includes bending of flexible stem holding the probe so as to position the probe in operative position adjacent the surface to be monitored.

26. A portable test apparatus useful to measure nonuniformity of a rotary member, comprising:

a probe for monitoring deflections of a surface of the rotary member during rotation of the rotary member and producing a first output signal indicative of the surface deflections;

a holder for holding the probe adjacent the surface of the rotary member to be monitored for uniformity; and an indexing device for producing a second output signal indicative of the rotational position of the rotary member during rotation thereof, the indexing device having an attachment mechanism for removable coupling to the rotary member.

* * * * *